United States Patent [19]

Li

[11] Patent Number: 5,684,693
[45] Date of Patent: Nov. 4, 1997

[54] METHOD FOR BIT-STREAM DATA COMPRESSION

[75] Inventor: Xuguang Li, Sugar Land, Tex.

[73] Assignee: Western Atlas International, Inc., Houston, Tex.

[21] Appl. No.: 557,617

[22] Filed: Nov. 14, 1995

[51] Int. Cl.$^6$ ................................................. G06F 19/00
[52] U.S. Cl. ............................................................ 364/422
[58] Field of Search ................................ 364/422, 421; 367/27, 81; 340/853.1, 855.5

[56] References Cited

U.S. PATENT DOCUMENTS

| | | | |
|---|---|---|---|
| 3,883,725 | 5/1975 | Fort et al. | |
| 4,121,297 | 10/1978 | Smith | 364/128 |
| 4,543,632 | 9/1985 | Ergas et al. | 364/421 |
| 4,847,813 | 7/1989 | Alam et al. | 367/57 |
| 5,014,134 | 5/1991 | Lawson et al. | 358/261 |
| 5,392,255 | 2/1995 | LeBras et al. | 364/421 |

OTHER PUBLICATIONS

Thomas S. Matthews, "Bidirectional Telemetry For Downhole Well Logging", Petroleum Engineer, Sep. 1977, pp. 56, 57, 62.

Introduction to Wavelets and Wavelet Transforms, Appendix C, Mattlab Programs, C. S. Burrus et al. May 22, 1995.

*Primary Examiner*—Donald E. McElheny, Jr.
*Attorney, Agent, or Firm*—William A. Knox

[57] ABSTRACT

A plurality of sensors, each of which is coupled to a data channel, are mounted on a downhole logging tool for periodically measuring and sampling, at preselected timed sample intervals, petrophysical characteristics of the borehole sidewall material. The sample values are arranged in a two-dimensional array of a plurality of time series in channel-sequential order, indexed by consecutive sample number. Means are provided for transforming the plurality of time series from the time domain to the wavelet domain. The wavelet coefficients for each transformed time series are compressed by thresholding. The compressed wavelet coefficients corresponding to each time series are transmitted to a receiver where the compressed wavelet coefficients are decompressed by formatting same into a broken sequence of wavelet coefficients. The original time series is reconstructed by inversely transforming the broken sequence of wavelet coefficients from the wavelet domain back to the time domain.

3 Claims, 5 Drawing Sheets

METHOD FOR BIT-STREAM DATA COMPRESSION

BACKGROUND OF THE INVENTION

1. Field of the Invention

Disclosed is a method for compressing and formatting the data stream emanating from a sensor array mounted on a downhole logging sonde. The purpose is to improve the data-transmission rate.

2. Discussion of Related Art

Boreholes are drilled into the earth for many reasons, one of which is to recover various natural resources such as hydrocarbons, sulphur, water, salt, potash, thermal energy and the like. During and after the drilling process, logging tools are passed down the borehole to measure the petrophysical characteristics of the borehole sidewall material. Measurements of interest include, inter alia, quantities such as electrical resistivity, radioactivity, acoustic velocity, acoustic reflectivity, temperature, inductance and self potential, from which data, the local fluid content, composition and texture of the sidewall material can be deduced. The resulting downhole measurements are transmitted from the logging tool to surface instrumentation through a suitable logging cable.

Another application of downhole logging by way of example but not by way of limitation involves vertical seismic profiling (VSP) which is used to provide information about bulk characteristics of the earth formation in the vicinity of the borehole. In this regimen, one or more seismometers, often a 3-component transducer having three orthogonal axes of sensitivity, are mounted on a logging tool and lowered into the borehole. To execute a recording episode, an acoustic source, such as a chirp-signal generator or a pneumatic impulsive device such as an air gun, located at or near the surface of the earth, usually offset from the maw of the hole, generates an acoustic wavefield for insonifying subsurface earth layers. During a selected listening-time interval such as 6 to 20 seconds, a portion of the wavefield may be reflected and/or refracted from the respective earth layers through which and beneath which the borehole has been drilled, to be detected by the transducer(s) in the logging tool. Other portions of the wavefield may propagate directly from the source to the downhole transducer(s) along a slant path. Depending upon the problems to be solved, a recording episode may be instigated with the transducers being stationed at selected depth intervals such as every one-hundred feet over some desired interval of special geologic or economic interest. See for example, U.S. Pat. No. 4,847,813 issued Jul. 11, 1989 to Aftab Alam et al.

The usual industry-standard logging cable includes 7 conductors of which at least two conductors are dedicated to data transmission between the sonde and surface instrumentation including data-storage media. Typically, the data transmission rate is band-limited, 93 kilobits/second (kbit/s).

In the case where the logging tool is configured for VSP, five, three-component sensors may be installed on the tool at vertically spaced-apart intervals. The data-sampling rate may be set to 2-millisecond (ms) intervals or less for each of the 15 sensors whose output may be time-multiplexed onto the logging cable. In the case of a vibrator, the listening time for a single recording episode might be 20 seconds (s). Since each sample of data is 16 bits long, at a 2 ms sample rate, for 20 s, at 93 kbit/s, it will take 55 s to transmit the seismic data for one recording episode if data transmission takes place following the 20-second listening-time interval. Thus the logging tool must loiter at each depth level for a total of 75 s or about 1.5 minutes, allowing for redeployment of the source. Accordingly, for a borehole that is two miles deep, more than two hours will be expended in data collection if 100-foot station intervals are required. If ¼-second sampling rates are used, as is common in well logging, then the borehole occupation time will be octupled.

Borehole rig-time is extremely expensive. It is therefore essential to reduce the loiter time of the logging tool at any one depth level during a logging run. That desideratum can be accomplished by compressing the length of the data stream so that less time is consumed transmitting data up the hole from the tool to the surface processing and storage devices. A compression ratio of 3:1 to 10:1 is desired.

An early compression method involves axis-crossing coding such as is taught by U.S. Pat. No. 3,883,725, issued May 13, 1975 to Robert Fort et al. Although it applies to a surface-deployed seismic data acquisition system, it may be adapted to a multiple-sensor VSP data-gathering. Methods similar to the above method employing operations with the sign bit only, may be found in U.S. Pat. Nos. 4,543,632 issued Sep. 24, 1985 to R. A. Ergas et al. and 4,121,297 issued Oct. 17, 1978 to J. W. Smith.

Other well-known data compression methods, including Huffman coding, run-length encoding, and dictionary methods such as ZIV, are available but the compression ratio is limited.

As above stated, a method that can achieve a data-compression ratio of from 3:1 to 10:1 without noticeable signal degradation would be useful. A system that exploits a capability for Discrete Wavelet Transform, next to be explained, fulfills that quest.

An oscillatory function of time that is non-zero throughout its extent may be represented by a conventional Fourier series in sines and cosines. If, however, the function is a transient of limited length, it would take virtually an infinity of Fourier terms to cancel out the oscillations outside the region where the function is non-zero.

A non stationary wavelet transform has an advantage in the presence of a transient because a basis or mother function can be translated and scaled to encompass the span and locale of the transient function. For purposes of this disclosure, a basic wavelet is defined as a function that integrates to zero over its extent, a property that the more familiar seismic wavelets do not necessarily exhibit.

A wavelet f(x) may be represented as $$f(x) = \sum_k c_k \phi_k(x) + \sum_{j,k} d_j \psi(2^j x - k) \quad (1)$$

where $\psi(x)$ and $\phi(x)$ are the mother or analyzing function and the scaling function respectively. They have local support (i.e., they are non-zero only over a limited scaling interval) because they are generated by the scaling coefficient j (analogous to transient length) and the translation coefficient k (analogous to phase shift) and hence represent discrete transient signals quite well. They constitute an automatic windowing system. For high frequencies, j is large and $\psi(2^j x - k)$ is a compressed version of $\psi(x-k)$. For low frequencies, j is negative and $\psi(2^j x - k)$ is a dilated version of $\psi(x-k)$. Thus, according to one authority, when the data trend is long, the window is large and when the data trend is short, the window is short. Wavelets can zoom in to capture the signal character. Data compression is achieved by representing the data stream using the normalized quantized sample coefficients of the wavelet transform which may be a completely lossless, invertible step.

A method for image compression, but one that can be applied equally well to periodic functions of time such as petrophysical data measurements, by way of example but not by way of limitation, is disclosed in U.S. Pat. No. 5,014,134 issued May 7, 1991 to W. M. Lawton et al. and which is incorporated herein by reference.

The sample coefficients of the transform may be thresholded and values less than some selected level are rejected to achieve the desired compression ratio although a minor amount of data leakage may result. One method for thresholding involves nondestructively ordering the coefficients of the wavelet-transformed sample in descending order of absolute value, preferably expressed as an integral power of two. The compressed data stream includes as its members, only a preselected upper percentile of the ordered sample coefficients. By inversely transforming the thus-retained coefficients, the original signal can be recovered with but very little leakage of the fine detail of the original signal characteristics because of the truncation.

Discrete wavelet transformations may be accomplished using any one of several shareware computer programs that are publicly available. One such program for example, may be found in the appendix of the publication *Introduction to Wavelets and Wavelet Transforms*, by C. S. Burrus et al. and published by Rice University of Houston, Tex., dated May 22, 1995.

Known methods for thresholding do not provide information regarding the sample-time slots corresponding to the respective rejected data values. That is, the signals that are reconstructed from the retained data tend to be low-pass filtered and, perhaps, excessively smoothed because the temporal positions of the rejected values in the data stream are unknown.

There is a need for an efficient data-compression method for use in transmitting data from borehole logging tools over a band-limited tranmission link which will provide information as to the whereabouts of data values that are rejected due to thresholding.

SUMMARY OF THE INVENTION

A data transmission system for decomposing, transmitting, decompressing and reconstructing a discrete time series of data samples consists of at least one downhole sensor for measuring the magnitude of a petrophysical characterisitc of the borehole sidewall. An A/D converter samples and indexes the analog signal at preselected timed intervals. A microprocessor is operatively coupled to the output of the A/D converter for discretely transforming the indexed data samples from the time domain to the wavelet domain, thereby to provide a consecutive sequence of indexed wavelet coefficients. Logic means decompose the indexed consecutive sequence of indexed wavelet coefficients by thresholding a preselected upper percentile of the wavelet coefficients when sorted in descending order according to their absolute values. The thresholded wavelet coefficients are decomposed to create a first vector of the decomposed thresholded coefficients. A second concomitant vector is established for preserving the identity of the sample index corresponding to each of the thresholded coefficients. Means, such as a programmed digital computer, receives the first vector of decomposed thresholded wavelet coefficients and said second concomitant vector, decompresses the first vector of decomposed wavelet coefficients and formats the decompressed wavelet coefficients into a broken sequence. The computer is programmed to inversely transform the broken sequence of wavelet coefficients from the wavelet domain to the time domain to provide a reconstructed data set for storage and subsequent display.

In an aspect of this invention, a plurality of sensors, each of which is coupled to a data channel, are mounted on a downhole logging tool for measuring petrophysical characteristics of the borehole sidewall material. Means are coupled to the sensors for periodically sampling and discretizing the petrophysical measurements. The sample values are arranged in a two-dimensional array of a plurality of time series in channel-sequential order, indexed by consecutive sample number. Means are provided for transforming the plurality of time series from the time domain to the wavelet domain. The wavelet coefficients for each time series are compressed by thresholding. The compressed wavelet coefficients corresponding to each time series are transmitted to a receiver where the compressed wavelet coefficients are decompressed by formatting same into a broken sequence of wavelet coefficients. The original time series is reconstructed by inversely transforming the broken sequence of wavelet coefficients from the wavelet domain back to the time domain.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1:
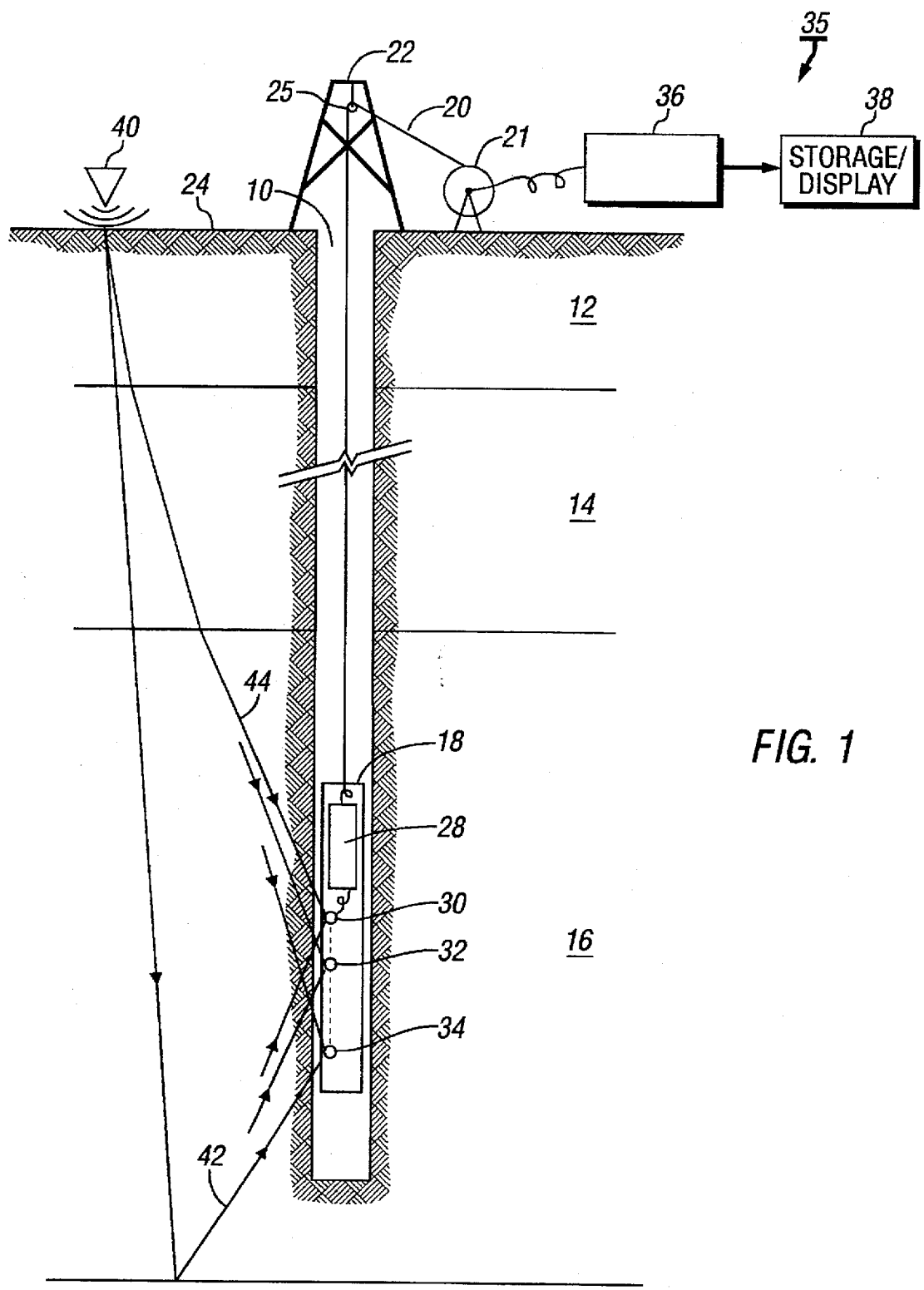
FIG. 1 shows a logging tool in a borehole with associated surface equipment.

Please refer to FIG. 1 where there is shown a borehole 10 drilled into earth formations such as 12, 14, 16. A logging tool 18, is lowered into the borehole on the end of a logging cable 20 by draw-works 21 from a derrick rigging 22 at the surface, 24, of the earth. The depth of tool 18 in borehole 10 is measured by means of an odometer associated with a sheave 25 over which logging cable 20 passes, sheave 25 being suspended from the crown block (not shown) or other appurtenance of rig 22. Logging tool 18 includes a downhole data processing unit 28, such as a microprocessor, and a sensor array such as several multi-component sensors 30, 32, 34 which may be seismic. The downhole processing unit 28 discretizes the analog signals emanating from the sensors, reformats, compresses and multiplexes the digital data for transmission uphole by means of a band-limited telemetric system of any well-known type associated with logging cable 20.

Instrumentation at the surface, generally shown as 35, includes a general purpose digital computer 36, operatively coupled to the logging cable 20 at draw-works 21, for receiving, demultiplexing, decompressing and reformatting the data harvested by the sensors 30, 32, 34 on logging tool 18. The thus-processed data are transferred to a recording/display device 38 which may include a magnetic tape recorder or other storage device, for archival storage of the data and for the subsequent academic analysis and economic exploitation thereof.

It must be understood that the method and apparatus of this disclosure is being described for convenience in terms of a VSP operation by way of example only but not by way of limitation. Any other desired type of well-known borehole sensor or sensors may be substituted for the exemplary seismic sensors in logging tool 18. It should be further clearly understood that the characteristics of the downhole and surface instrumentation are necessarily commensurate with the known needs of whatever type of sensors may in fact be mounted on the logging tool.

Figure 2:
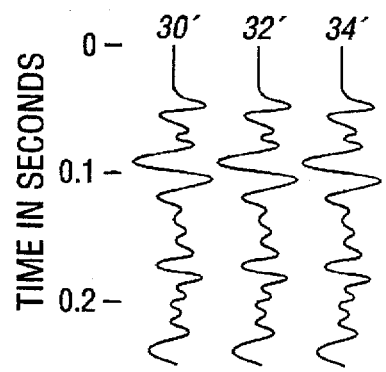
FIG. 2 is a suite of time scale traces as might be recorded by seismic sensors mounted on the logging tool.

In terms of the exemplary disclosure, an acoustic source 40 such as an air gun excites the earth to generate a seismic wavefield that propagates along reflected ray paths 42 and direct ray paths such as 44 (which may be refracted at formation interfaces), to be detected by sensors 30–34. Sensors 30–34 detect the earth motions due to the arriving wavefield events and convert the earth motions to electrical signals as a periodic electrical wave train in the time domain representing signal amplitude as a function of wavefield travel time such as shown by time-scale traces 30', 32', 34', FIG. 2.

As explained earlier in this disclosure, it is desired to compress the data bit stream transmitted uphole to reduce the time required by the logging tool for occupying the borehole. The presently preferred method is based upon transforming the data samples, which represent the discretized analog signals detected by the sensors, from the time domain to the wavelet domain as previously discussed. With the data transformed to the wavelet domain, the data are compressed by preserving only those wavelet coefficients whose absolute value exceeds a preselected threshold value. The threshold value is determined on the basis of a desired compression ratio r:1 where r is greater than unity but less than the total number of samples, n. Preferably r is on the order of about 3:1 to 10:1 although a greater compression ratio could be used.

Figure 3:
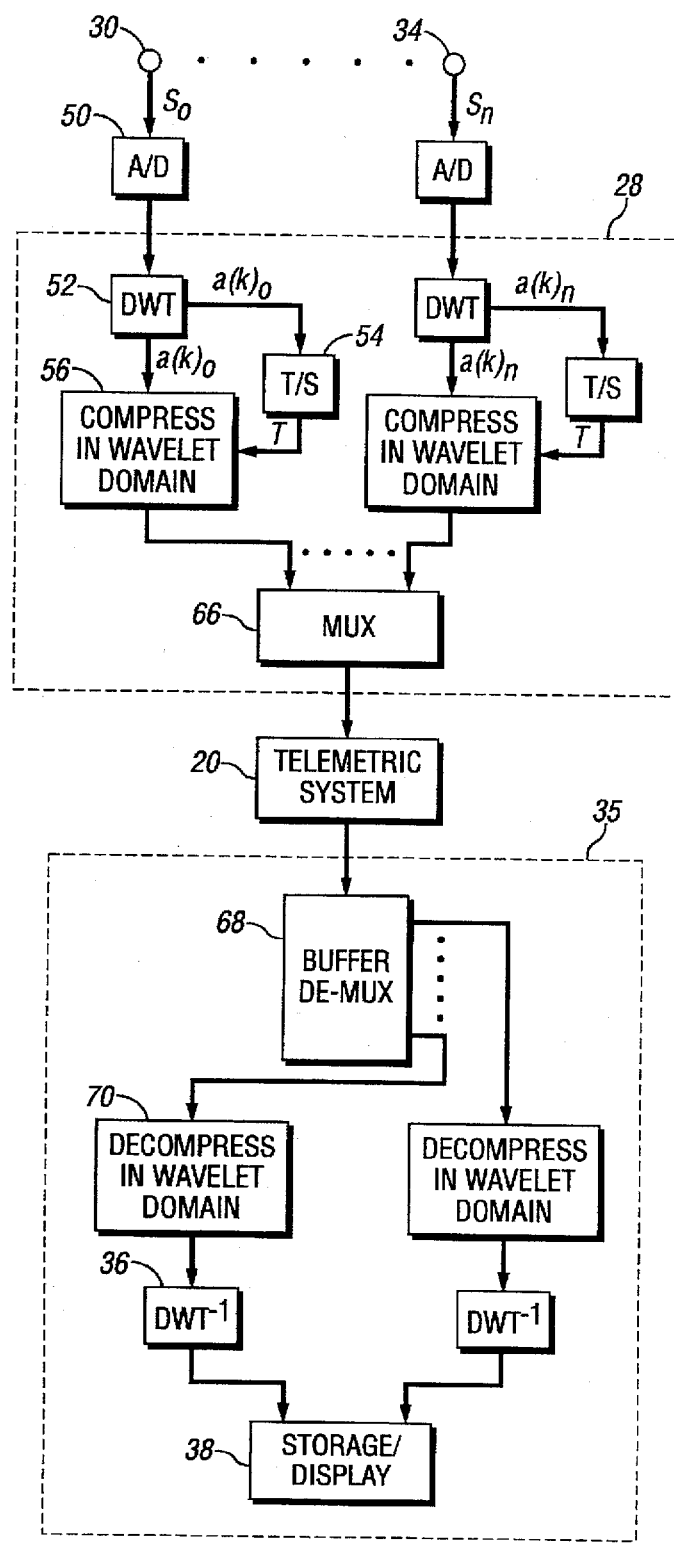
FIG. 3 is a general flow diagram illustrating the preferred method of this invention.

The method will be best understood by reference to FIG. 3 which is a flow diagram of the processes supported by the downhole processor 28 and the surface instrumentation 35.

In FIG. 3, conventional well-known equipment such as a system clock, power supplies, command communication facilities, mechanical logging-tool manipulation devices such as calipers, and other commonplace paraphernalia are not shown to avoid unneeded drawing complexity.

In FIG. 3, the downhole processor shown inside the dashed box 28 may conveniently be a programmed microprocessor of any desired type. A plurality of m sensors such as 30–34 (m=1, . . . ,M), which are usually although not necessarily analog devices, measure the magnitude of a desired petrophysical quantity, which measurements are sampled and digitized at selected time intervals, such as 2 ms, and indexed by sample number, as controlled by a system clock and sample counter in any well-known manner. Since the processing sequence is identical for each channel, only the data flow through left-hand channel 30 will be described in detail. The measured analog signals are digitized in A/D converter 50 whence the digital samples are fed into microprocessor 28. A portion, 52, of the logic circuitry of the microprocessor is programmed to transform the data samples from the time domain to the wavelet domain using any one of the well-known Discrete Wavelet Transform (DWT) computer programs listed previously. The output of operation 52 is a consecutive sequence of indexed wavelet coefficients $a(k)_n$, where n is the sample index number. The $a(k)_n$ are delivered to threshold selector (T/S) 54 and to wavelet compressor 56, the operations of which will now be described with the aid of FIGS. 4 and 5 respectively.

Figure 4:
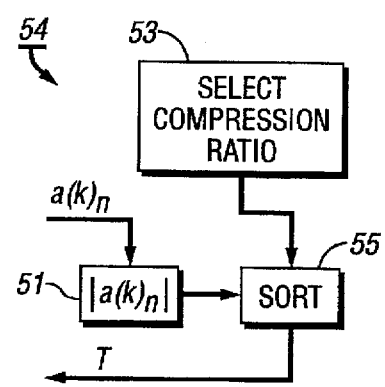
FIG. 4 is a detail of the threshold logic.

Please refer first to FIG. 4 showing the operating details of threshold selector 54. The coefficients $a(k)_n$ are converted to absolute values in rectifier 51. A desired threshold level is selected in ratio selector 53 as an operator input to provide a desired compression ratio. In step 55, the $a(k)_n$ are sorted according to descending order of absolute magnitude. Program step 53 supplies a threshold value T that will delimit an upper percentile, P=n/r, of the samples from among the n wavelet coefficients $a(k)_n$.

Figure 5:
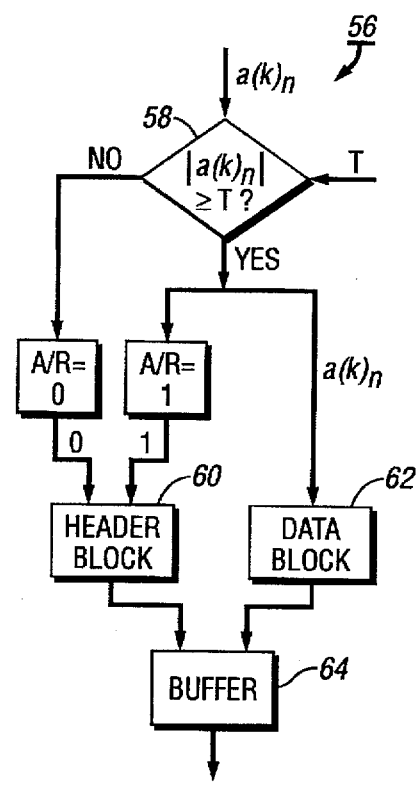
FIG. 5 illustrates the criteria for setting the accept/reject flag to provide data compression in the wavelet domain.
Figure 6:
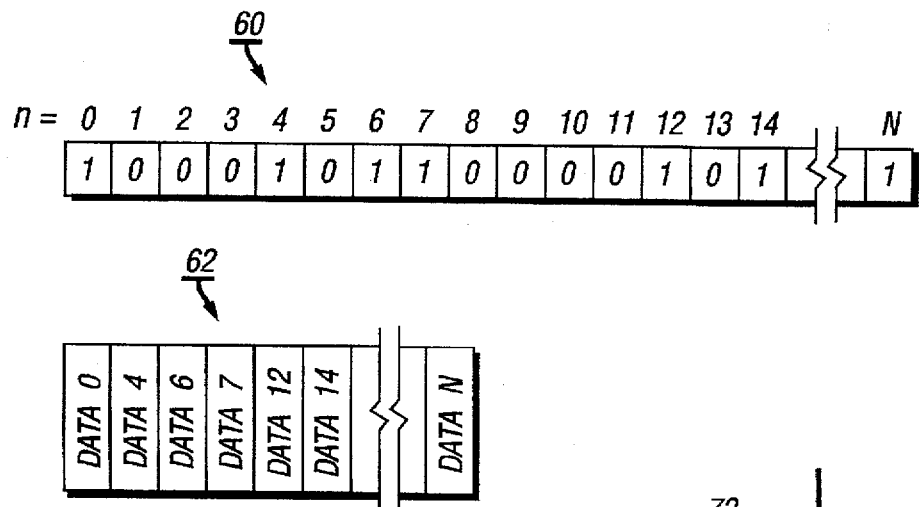
FIG. 6 illustrates the layout of the header block and the data block.

The function of step 56, FIG. 3, is best understood by reference to FIGS. 5 and 6. The wavelet coefficient corresponding to each data sample enters decision logic 58, FIG. 5, from the output of the DWT transformation operator of step 52, FIG. 3. The absolute value of that coefficient is compared to the threshold value, T, from step 55, FIG. 4. If the indicated inequality is true, the coefficient in question is accepted; otherwise it is rejected. Step 56 thus decomposes the consecutive sequence of indexed wavelet coefficients by thresholding a preselected upper percentile of the rectified coefficients.

Before proceeding further in the exegesis of the flow diagrams, refer for the moment to FIG. 6. A recording episode results in a data record for each of the M sensor channels. It will be remembered that each original data record has a length of n samples (n=1, . . . ,N), the number of samples being a function of the total time of the recording episode and the sampling interval $\Delta t$, often many thousands. It is desired to reduce the number of samples that must be transmitted uphole. Accordingly, let each data record consist of a header block 60 and a data block 62 as shown in FIG. 6. The header block 60 consists of a limited number of frames (not shown) that record factual information about the environment of the corresponding data channel which is encoded by one bit per frame. Header block also includes a plurality of accept/reject (A/R) flags, one for each sample interval. The data block 62 consists of one frame per accepted data sample. Each data sample conventionally includes 16 or more bits per frame depending upon the desired precision.

Returning now back to FIG. 5, if the absolute value of $a(k)_n$ equals or exceeds the threshold value T, the value for $a(k)_n$ is written in a frame of the data block. Concomitantly, the A/R flag is set to 1 in a frame in the header block that corresponds to the sample index number, n. If $|a(k)_n|<T$, no datum is written in the data block and the A/R flag in the header block is set to 0 for that sample index number.

FIG. 6 illustrates the operation: Wavelet coefficients 0, 4, 6, 7, 12 and 14 equaled or exceeded the selected value for T and have been written in the six consecutive frames of the data block, which however, is not their true sequential order in terms of sample index number. The A/R flags in the header block, 1 or 0, thus provided means for preserving the identity of the sample index corresponding to each of the thresholded coefficients so that after transmission the now decomposed, compressed data samples may be rearranged back in their true sequence. In the context of this disclosure, data block 62 comprises a first decomposed vector of the thresholded coefficients. The portion of the header block shown as 60 forms a second concomitant vector for preserving the identity of the sample index corresponding to each of the thresholded coefficients.

Referring now back to FIG. 3, the header block and the data block are assembled in serial order in buffer 64 for transfer to multiplexer 66 where the now-compressed data records from each of the M channels are multiplexed from parallel sample-sequential order by channel number to channel-sequential order by sample number in serial order in accordance with well-known telemetric practice. The resulting compressed data stream is thereafter transmitted uphole through logging cable 20, using any well-known telemetric system, to surface instrumentation 35 indicated by the dashed outline in FIG. 3 and which is preferably implemented by a general purpose digital computer of any well known type programmed to perform the respective steps indicated in the drawings.

Figure 7:
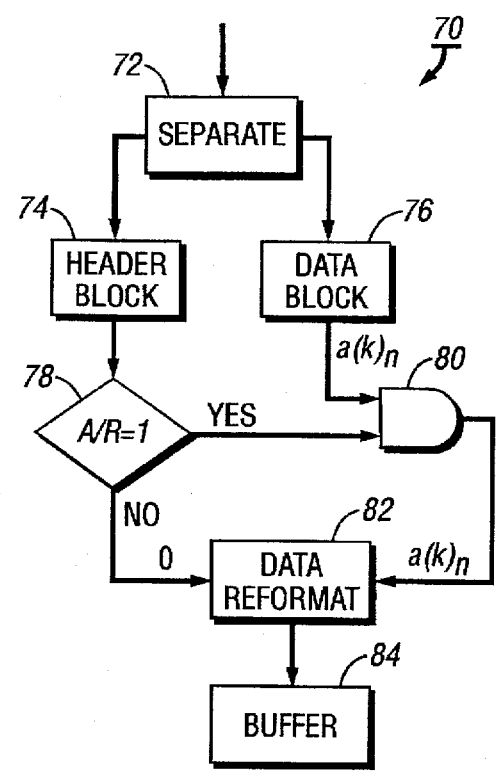
FIG. 7 indicates the steps needed to separate the header block from the data block and to decompress the data block in the wavelet domain.

Buffer/demultiplexer 68 provides means for receiving the decomposed first vector and its concomitant second vector where the data stream is demultiplexed back to sample-sequential order by channel number. As before, only the left-hand channel will be discussed in detail. From multiplexer 68, the data are decompressed and reformatted at step 70 which is illustrated in detail in FIG. 7. At step 72 the data stream corresponding to the channel in question is separated into a header block 74 and a data block 76.

Decompression in the wavelet domain proceeds as follows: For each consecutive sample n, the corresponding A/R flag from the header block is examined in comparator logic 78. If the nth flag is set to 1, ANDing logic 80 strobes DATAn to the nth frame in data reformatter 82. If n is set to 0, then the nth frame in data reformatter 82 receives a value of zero.

Figure 8:
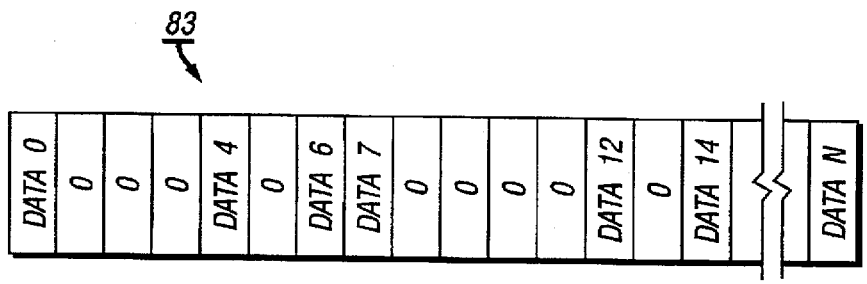
FIG. 8 shows symbolically, the recovered data stream after decompression.

FIG. 8 shows the contents 83 of reformatter 82 after the data stream of FIG. 6 has been decompressed in the wavelet domain. The contents 83 of data reformatter 82 represent an array of samples consisting of a broken sequence of the wavelet coefficients thresholded from among the n data samples of the mth channel as indexed by the contents of the second concomitant vector resident in the header block.

The contents of data reformatter 82 may be transferred to buffer logic 84 pending inverse transformation from the wavelet domain back into the time domain at step 36, FIG. 3, to provide a reconstructed data set. Thereafter, the reconstructed, transformed, decompressed data set may be displayed as time scale recordings as in FIG. 2, stored on a floppy disk or magnetic tape or CD ROM or on any other desired storage medium, 38, known or presently unknown.

Figure 9:
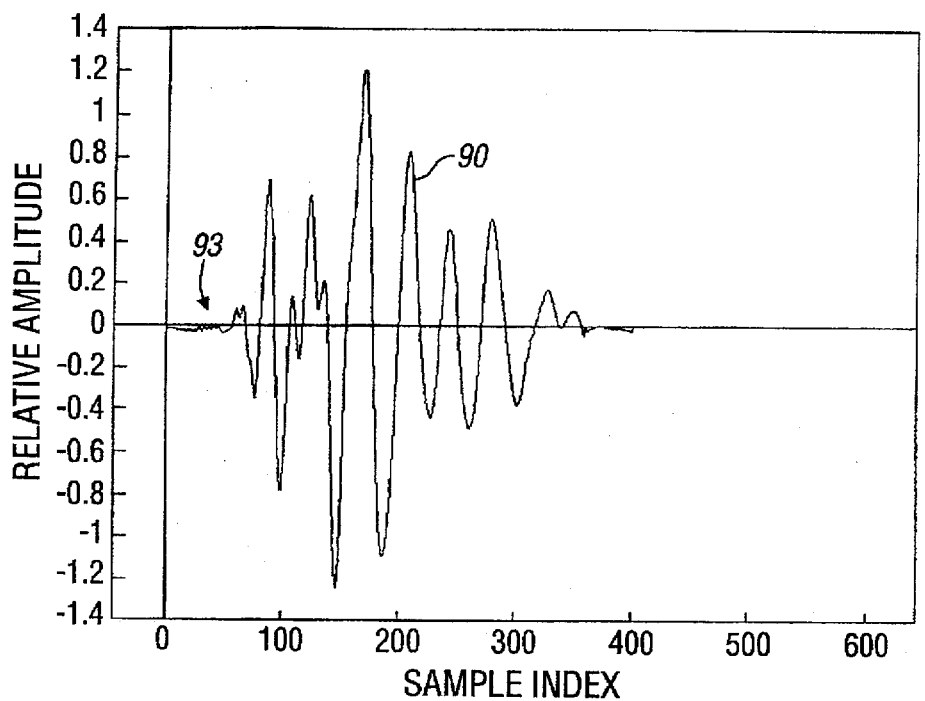
FIG. 9 is a field example of an acoustic wavefield as seen by a downhole sensor array.

FIG. 9 is a field example of an acoustic wavefield, as detected by a downhole sensor array. The analog signal, 90, which is shown here as amplitude, measured in arbitrary units vertically and sample index along the horizontal axis, was sampled at 24-μs intervals over 512 sampling points.

Figure 10:
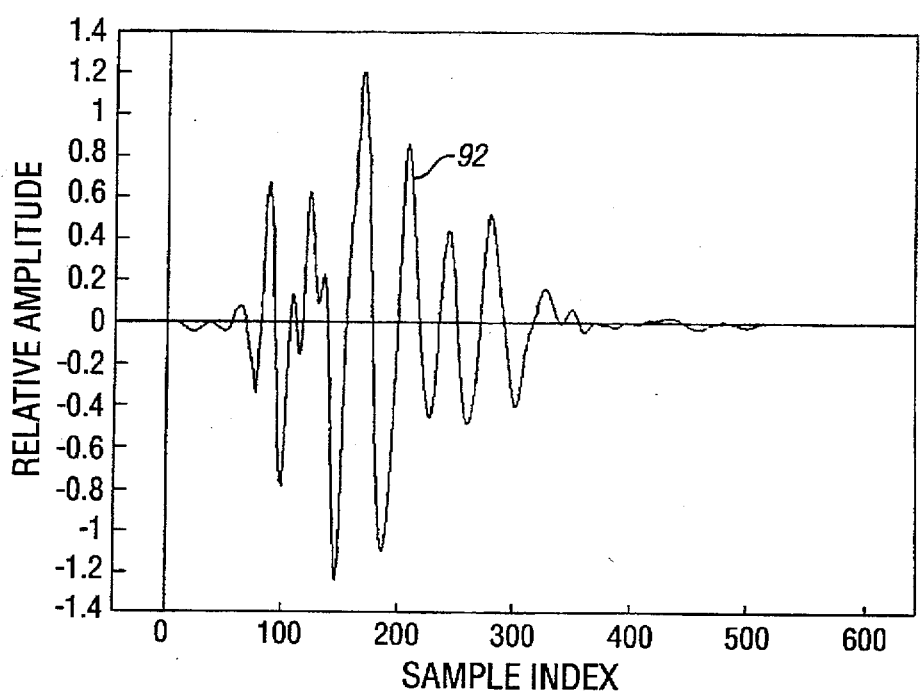
FIG. 10 is the waveform of FIG. 9 after discrete wavelet transformation, compression, transmission, decompression and inverse discrete wavelet transformation to the time domain.

FIG. 10 is a plot, 92, of the same signal recovered after transformation from the time domain to the wavelet domain, subsequent 10:1 compression, uphole transmission, decompression, inverse DWT transformation and reformatting. The very low-amplitude high frequencies seen over the first few data-sample indices indicated by 93 of FIG. 9, have been smoothed out as seen on the decompressed recovered wavefield of FIG. 10. The amplitude of the signal beyond about sample index 400 has been slightly exaggerated. But overall, the essential amplitude and frequency content of the original input signal has been faithfully retained.

Figure 11:
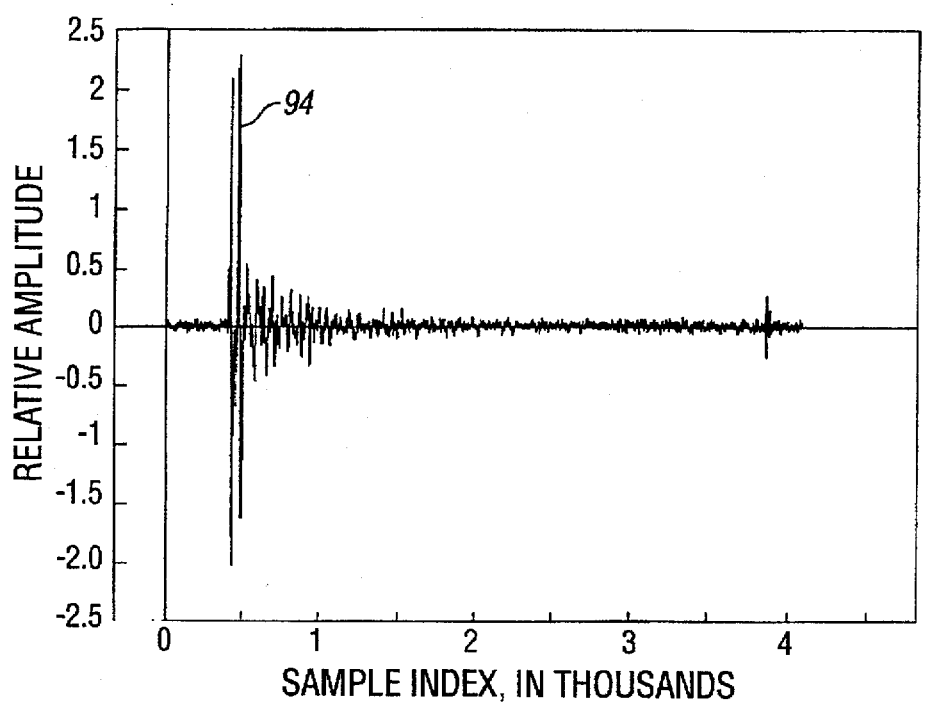
FIG. 11 is the downhole signature resulting from an air gun source at the surface.

FIG. 11 is the raw signature, 94, in the time domain of a surface-emplaced air gun source as seen by a downhole sensor array, graphed in arbitrary amplitude units vs. sample index, sample interval 1 ms.

Figure 12:
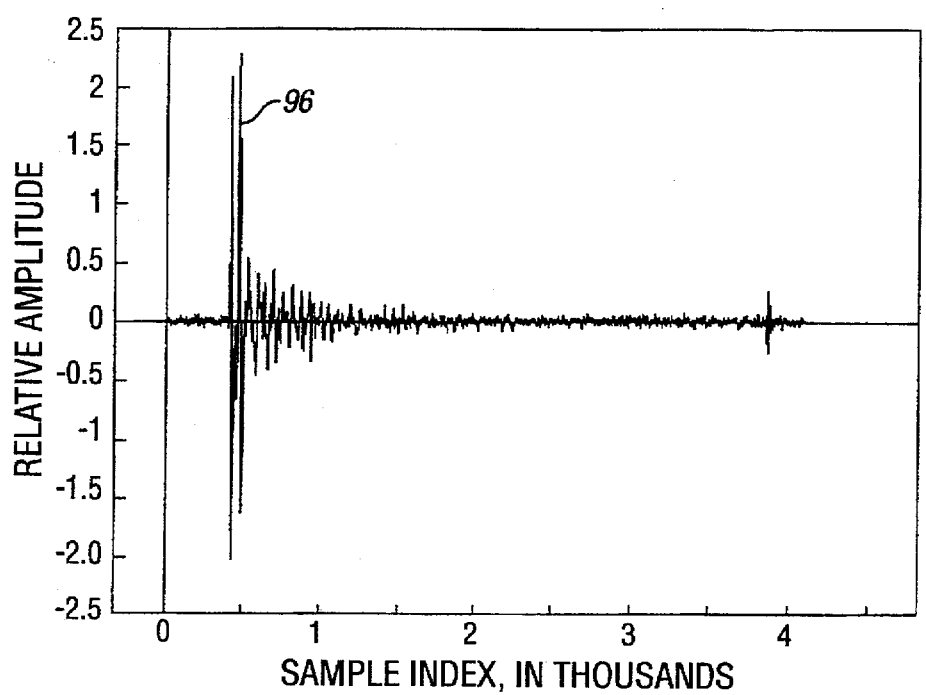
FIG. 12 is the decompressed signature of the air gun signature of FIG. 11 after 3:1 compression.

In FIG. 12, curve 96 is the reconstructed signature of FIG. 11 after transformation from the time domain to the wavelet domain, 3:1 compression, uphole transmission, decompression, inverse DWT transformation and final reconstruction. The reconstructed signature 96 is virtually indistinguishable from the original signature 94, probably because of the relatively benign 3:1 compression ratio.

This invention has been described with a certain degree of specificity by way of example but not by way of limitation. Specifically this invention is not confined to application to downhole seismic research. It may be applied to any desired downhole petrophysical measurements. The method also may be applied to ethereal data transmission between land-based survey stations. Those skilled in the art will devise obvious variations of the examples given herein but which will fall within the scope and spirit of this invention which is limited only by the appended claims.

What is claimed is:

1. Data-compression apparatus for use with a band-limited data-transmission channel, comprising:

at least one sensor means for providing measurements of the magnitude of a petrophysical quantity in the time domain;

means, operatively coupled to said sensor, for sampling said measurements at preselected timed intervals and for indexing the measurement-sample sequence;

microprocessor means, operatively coupled to said means for sampling, for discretely transforming the indexed measurement samples from the time domain to the wavelet domain, thereby to provide a sequence of indexed wavelet coefficients;

means for rectifying said wavelet coefficients;

first programmed logic means for decomposing the sequence of indexed wavelet coefficients by thresholding a preselected upper percentile of the rectified coefficients;

means for forming a first vector of thresholded, decomposed coefficients in a consecutive sequence;

means for forming a second concomitant vector for preserving the identity of the sample index corresponding to each said thresholded coefficient;

buffer means for assembling said first and second vectors;

means for receiving said first vector of decomposed wavelet coefficients and said second concomitant vector;

second programmed logic means for decompressing said first vector including a consecutive sequence of decomposed wavelet coefficients into an array consisting of a broken sequence of wavelet coefficients as indexed by said second concomitant vector;

third programmed logic means for inversely transforming said broken sequence of wavelet coefficients from the wavelet domain to the time domain thereby to provide a reconstructed data set; and means for displaying and archivally storing said reconstructed data set.

2. The system as defined by claim 1, comprising:

a downhole logging tool for mounting said at least one sensor means and for containing said sampling and indexing means, said microprocessor means, said rectifying means, said first programmed logic means and said buffer means;

surface instrumentation for containing said receiving means, said second programmed logic means, said third programmed logic means and an archival storage means; and a band-limited telemetric channel for interconnecting said buffer means with said means for receiving to provide data communication therebetween.

3. A computer-aided data-compression method for increasing the data transmission capacity of a band-limited telemetric channel associated with a borehole logging tool, comprising:

continuously taking downhole measurements of a selected petrophysical property of the sidewall of said borehole;

in the time domain, periodically sampling said measurements and indexing the sampled measurements in consecutive order;

discretely transforming said sampled measurements from the time domain to the wavelet domain to provide a sequence of indexed wavelet coefficients;

rectifying said wavelet coefficients;

decomposing the sequence of indexed wavelet coefficients by thresholding a selected upper percentile of the rectified wavelet coefficients to form a first vector including a continuous sequence of decomposed wavelet coefficients;

forming a concomitant second vector for preserving the identity of the sample index corresponding to each thresholded coefficient;

transmitting said first and second vectors over a band-limited telemetric channel to a computer-implemented receiving means;

decompressing the received first vector of a continuous sequence of decomposed wavelet coefficients into an array consisting of a broken sequence of wavelet coefficients as indexed by said second vector;

reconstructing the downhole petrophysical measurements by inversely transforming said broken sequence of wavelet coefficients from the wavelet domain to the time domain.

\* \* \* \* \*